INVENTORS
HANS RUMPF
KURT LESCHONSKI
BY
ATTORNEYS

United States Patent Office 3,520,407
Patented July 14, 1970

3,520,407
CLASSIFICATION METHOD AND APPARATUS
Hans Rumpf, Hansjacobstr. 12, Karlsruhe, Germany, and Kurt Leschonski, Forchheim, Germany; said Leschonski assignor to said Rumpf, Karlsruhe, Germany
Filed Aug. 29, 1967, Ser. No. 664,067
Claims priority, application Germany, Aug. 31, 1966, R 44,037; Aug. 17, 1967, R 46,730
The portion of the term of the patent subsequent to Mar. 28, 1984, has been disclaimed
Int. Cl. B07b 4/00
U.S. Cl. 209—139                          22 Claims

ABSTRACT OF THE DISCLOSURE

A classification method and apparatus for classifying granular material so as to separate fine and coarse particles from each other. The particles which are to be classified are centrifugually directed by a rotary distributor plate means into a classification stream which forms a cross stream into which the particles are centrifugally introduced and which is of a hollow cylindrical configuration of circular cross section surrounding the distributor plate means so that fine particles are entrained in this cross stream while coarse particles move transversely through and beyond the cross stream to be received in a discharge means which discharges the coarse particles while the fine particles which are entrained in the classifying cross stream can also be subsequently collected. In this way, it is possible to achieve a relatively large throughput of granular material in a substantially small space.

BACKGROUND OF THE INVENTION

Figure 1:
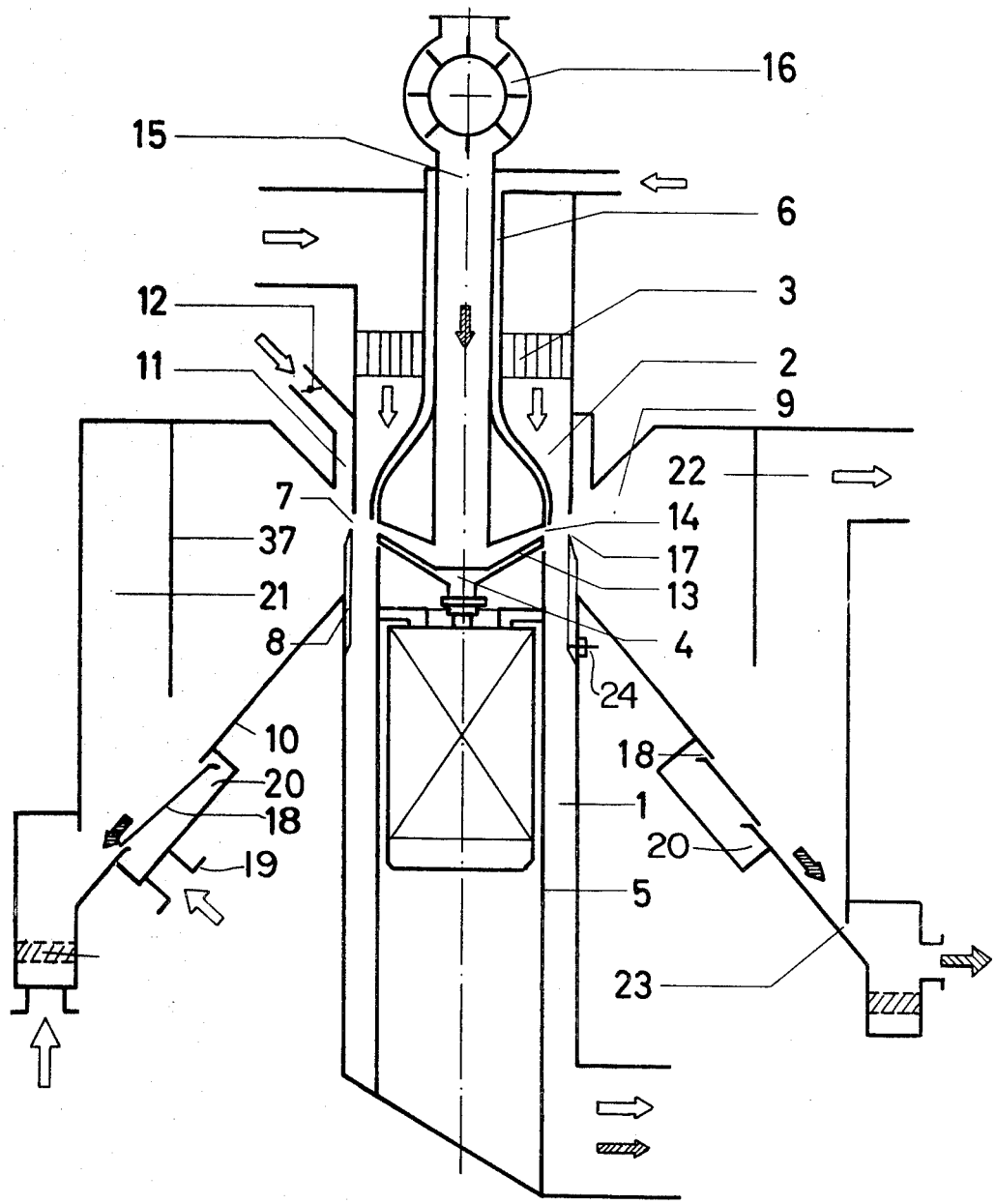

The invention relates to the classification of granular materials.

In particular, the present invention relates to that type of method and apparatus which is disclosed in U.S. Pat. No. 3,311,234. According to this patent a thin layer of the granular material which is to be classified is directed at a speed of at least five meters per second transversely into a laminar, classifying cross stream which has a speed of at least twenty meters per second so as to entrain in this cross stream the fine particles while eliminating the dominant influence of gravity, and the coarse particles move through and beyond the cross stream without rebounding or flowing back into the cross stream and without disturbing the laminar flow of the cross stream. This cross stream is of a substantially flat rectangular configuration in cross section and the same is true of the thin layer of particles which are to be classified, these particles being thrown along predetermined trajectories into the cross stream with the coarse particles reaching an outer zone of turbulence at the side of the cross stream which is distant from the region where the thin layer of particles is initially introduced into the cross stream. With this method and apparatus it is possible to classify particles having a classification limit, cut-size point or separation point of less than 1 mm.

The term classification limit, cut-size point or separation point where used throughout the specification, is defined as that size of the particles which has equal chance of being found in the fine or coarse fraction, i.e. fifty percent of the particles of the same size as the cut-size will be found in the fine fraction and fifty percent in the coarse fraction.

It has been found, however, that for every centimeter of width of the classifying gas stream along which the material to be classified is directed in a given unit of time it is not possible to achieve a supply of material beyond a given value, first because of the requirement that the material be delivered to the classifying stream in a thin layer and second because of the arrangement of the thin layer and the classifying stream itself in flat substantially rectangular configurations and cross section. Thus, in order to maintain the sharp limits of classification it is possible to achieve only a limited throughput with the method and apparatus of this patent. While it might be possible to achieve relatively large throughputs with such a method and apparatus, this latter result could only be obtained with an installation of undesirably large magnitude.

Also, it has been found that with the method and apparatus of the above patent if there are fine particles clinged to coarse particles which move through and beyond the classifying stream, the efficiency of separation of the coarse particles and fine particles from each other in the cross current is not as great as might be desired, because the planes defined by the curved trajectories the particles are parallel to each other.

SUMMARY OF THE INVENTION

It is, therefore, a primary object of the present invention to provide an improved classification method and apparatus of the above general type which requires only a relatively small space and a relatively inexpensive structure while at the same time and at the same sharpness in the classification achieving a far greater throughput than is possible with a method and apparatus involving an installation of comparable magnitude of the type disclosed in the above patent, for example.

Also, it is an object of the present invention to provide and improved classification method and apparatus which will to a very great extent separate fine particles clinging on coarse particles from the latter and disagglomerates or other collections of fine particles.

With the present invention also the cross stream which produces the primary classification flows at a speed which is at least 20 meters per second and the granular material which is to be classified is transversely introduced into the cross stream in the form of a thin layer at a speed of greater than 5 meters per second. The coarse particles are thrown transversely through the classifying stream without rebounding back or flowing back into the latter and without in any way disturbing the flow thereof while the fine particles are entarined in the classifying stream with the elimination of the dominant influence of gravity. However, in accordance with the present invention, the classifying laminar cross stream is provided with a hollow cylindrical configuration of circular cross section, the apparatus including a hollow cylindrical conduit means provided with inner and outer coaxial cylindrical walls which are specd from each other to define between themselves the space through which the classifying stream longitudinally flows. These cylindrical walls are formed at substantially the same elevation substantially in a plane normal to the common axis of the cylindrical wall with annular openings, and a rotary distributing plates means is surrounded by the inner cylindrical wall and has its outer periphery situated at the annular opening thereof for delivering the particles to be classified to this annular opening of the inner cylindrical wall to flow through the latter opening transversely into the hollow cylindrical cross stream. A flow control means communicates with the space between the cylindrical walls to provide the classifying stream which flows longitudinally between the cylindrical walls, and an annular discharge means coaxially surrounds the outer cylindrical wall and communicates with the annular opening thereof for receiving the coarse particles which pass through the annular opening of the outer cylindrical wall to be received in and discharged by this discharge means.

The method and apparatus of the invention provides for the particles which are to be classified radial and tangential speed components which are of equal magnitude for all the particles respectively, thrown in the hollow cylindrical cross stream where the classification takes place. Thus, as a result of this method and apparatus of the present invention, it becomes possible to achieve a relatively large throughput of classified granular material in a relatively small space and with a structure which is of relatively low cost.

The radial thickness of the hollow cylindrical classifying stream of gas can be on the order of a few or even more centimeters. The speed of flow thereof, of course, is always greater than 20 meters per second. In many cases, however, this speed is in the order more than 50 meters per second and less than 100 meters per second.

However, in accordance with a highly advantageous embodiment of the invention the radial width of the classifying cross stream is only on the order of a few millimeters, such as, for example 1–5 mm., so that this radial width or thickness is less than 1 cm. The speed of flow of the classifying gas stream is then, however, increased. Advantageously, in this case the speeds of flow of the classifying stream or jet respectively can be between 100 and at least 200 meters per second. Thus, this thin stream will possess more specific energy and is less radially deflected by the particles which are centrifugally introduced into the classifying stream than a stream with lower speeds of flow. This results from the ratio between the speed of flow of the classifying stream and the speed of movement of the particles. The greater this ratio the smaller the concentration of particles in the classification zone, and thus the less the extent of disturbance of the cross stream from an ideal cross stream, so that an extremely high degree of sharpness in the classification can be achieved.

The advantage of the use of a classifying gas stream of extremely small radial thickness of the order of only a few millimeters, as contrasted with a classifying gas stream having a radial width on the order of several centimeter, resides in the fact that the total amount of gas required to form the classifying stream can be maintained relatively low. As a result it becomes possible to achieve the advantage of providing a relatively small installation to provide the required circuit for the gas which forms the classifying stream. The throughput of classifying gas in this manner be reduced, in accordance with the adjustment of the apparatus, to an extent of one tenth to one twentieth. With the higher speeds of flow of the classifying stream and the smaller amounts of gas required therefore, the specific energy of the gas stream becomes naturally greater than where there is a low speed of flow and a large amount of gas for a relatively thick classifying stream. Therefore, the total amount of energy required to achieve the required speed for the classifying stream is approximately the same in both cases.

This feature of the present invention yields the advantage that particles of the same size increase their distance from each other not only along their flight path, but that in addition simultaneously particles entering the classifying gas stream side by side have the distance therebetween increased, i.e. each particle increases its distance in two directions perpendicular to each other from particles that were in the plane of entry immediately adjacent the particle.

The fine particles which are entrained in the classifying stream have the distance therebetween increased because of the greater speed of the classifying stream. Moreover, the angular symmetrical arrangement of the hollow cylindrical classifying stream around the circular entrance zone for the granual material which is to be classified provides an extremely compact assembly for the classifier of the invention.

For the particular volume which is required for the method and apparatus of the invention an extremely large yield is achieved. Furthermore, even when a relatively large amount of granular material is delivered to the classifying zone, a very high degree of sharpness in the classification is still achieved.

In accordance with a further feature of the invention, without increasing the radial thickness of the classifying stream, it is possible to increase the length of the trajectory of the particles in the classifying zone by providing the angularly symmetrical classifying stream with a predetermined twist about its axis. This feature provides the advantage of providing for the trajectories of the coarse and fine particles an even greater separation from each other without requiring an enlarged classifying space. The twist which is imparted to the classifying stream is selected in such a way that its tangential speed component is directed oppositely to the tangential speed components of the particles, so that a highly advantageous extension of the paths of movement of the particles is achieved in a manner which is particularly suitable for many types of classifications. Furthermore, by superimposing on the classifying stream a twist which is oppositely directly to the direction of rotation of the rotary distributing plate which delivers the material to the classifying stream the relative speed between the particles which are introduced into the classifying stream and the speed of movement of the classifying stream itself is increased, so that any agglomerations of the granular material are broken up to a greater degree.

In the case where the material to be classified, in the angularly symmetrical classifying stream which is of a radial thickness of several centimeters, is of the type where fine particles cling to the coarse particles, or of the type where agglomerations of the fine particles are present or where clouds or localized concentrations of the fine particles form in the classifying zone, so that fine particles are unavoidably received in the receiving means for the coarse particles, it is of advantage to increase the degree of sharpness of the classification by two specific measures which may be applied individually or which may be used in common but separately from each other.

The first of these measures resides in directing the material which is to be classified through a preliminary classifying stream which is of the same angular symmetry as the primary classifying stream and which is directed in the same direction but is quite distinct from and applied in addition to the primary classifying stream, this additional preliminary classifying stream being provided with a speed which is greater than that of the primary classifying stream. The additional classifying stream is situated at the entrance zone of the particles surrounding this entrance zone and having a radial thickness which is relatively small in relation to that of the outer surrounding primary classifying stream which is subsequently reached by the particles. The path of the particles through this additional inner classifying stream of high speed need only be in general relatively small, such as, for example, on the order of a few millimeters. In this manner it is possible to break up relatively loose agglomerates, to separate from coarse particle fine particle which cling thereto, and to separate the fine particles from the concentrations of coarse particles, so that the material which is to be classified is divided up prior to the subsequent classification of the particles. In this way, the particles are loosened and separated from each other to a greater degree before they reach the primary classifying zone and the fine particles which are situated at the upper part of the layer of material are downwardly transported, entrained in the classifying stream.

The second measure which may be resorted to, also in the case of a classifying stream which has only a relatively small radial thickness on the order of a few millimeters, resides in breaking up the agglomerations of fine particles and separating from the coarse particles fine particles which cling thereto in the interior of the discharging means which receives and discharges the coarse particles as well as such agglomerations of fine particles and fine particles clinging to coarse particles, while dispersing the thus-separated fine particles in a gas and directing the thus-dispersed fine particles out of the discharge means for the coarse particles by way of a subsequent classification. The fine particles which are thus dispersed and suspended in the gas within the discharge means which receives the coarse particles are advantageously subsequently joined with the primary amount of fine particles separated by the classifying stream. Therefore, it is possible to unite the fine particles which are separated in this second stage with the fine particles entrained in the primary classifying stream in such a way that they are taken in common with the latter fine particles from the classifying stream, thus avoiding the necessity of additional separating apparatus. In order to provide for breaking up of agglomerations in the discharge chamber which receives the coarse particles from the primary classifying stream, it is possible to subject the particles in the discharge means to an impact action so that in this way the coarse particles which enter at high speed into the discharge chamber are subjected to impact on an impact wall which surrounds the classifying zone as well as by striking of the particles themselves against each other in the stream. In order to avoid wear of the impact wall, as well as to avoid the clinging of fine particles thereto. This wall is covered with a loose rubber curtain.

The fine particles which still cling to the coarse particles can be blown away from the latter by subjecting the coarse particles to the action of an elutriation gas, and the fine particles separated in this way from the coarse particles can be united with the fine particles which are separated as a result of the impact action to be dispersed in a suitable gas in which the fine particles are suspended. The thus-dispersed fine particles are directed to the second classification stage which preferably takes the form of gravity classification where the stream of particles suspended in the gas is provided with a speed adapted to the particular classification limits achieved by adjustment of the apparatus. The elutriation gas forms the suspension gas in which the fine particles are suspended for the purpose of gravity classification.

At the region where the coarse particles move outwardly beyond the classifying stream where the latter has the form of a free stream, a certain amount of gas will be sucked from the free stream at the exterior thereof. Additional gas is delivered from the exterior just upstream of the discharge region of the coarse particles from the free classifying stream to join said stream.

The return of coarse particles already separated back into the classification stream is reliably prevented so by collecting them in a sufficiently large discharge means from the walls of said means the coarse particles will not be rebound into the classifying stream and not be not to be rebound into the classifying stream and not be entrained with the fine particles in the classifying stream.

BRIEF DESCRIPTION OF DRAWINGS

The invention is illustrated by way of example in the accompanying drawings which form part of this application and in which:

FIG. 1 is a schematic representation of one possible embodiment of a method and apparatus of the invention according to which the classifying stream is directed downwardly;

FIG. 1A is a schematic representation of another embodiment of a method and apraratus of the invention wherein an additional gas stream from the discharge region is directed to the lower end of the classifying gas stream;

FIGS. 2–9, respectively, illustrate in transverse sectional elevations various embodiments of a rotary distributing plate means of the invention;

FIG. 10 is a schematic representation of an embodiment of the method and apparatus of the invention according to which the classifying stream is directed upwardly;

FIG.11 is a schematic flow diagram of an entire installation used with the method and apparatus of the invention.

DESCRIPTION OF PREFERRED EMBODIMENTS

The classifier which is illustrated in FIG. 1 has an elongated hollow cylindrical conduit means 1 of annular cross section formed by an inner cylindrical wall 5 and an outer cylindrical wall coaxially surrounding and spaced from the cylindrical wall 5 so as to define with the latter an elongated hollow cylindrical space in which the cylindrical classifying gas stream flows. A flow control means communicates with the space between the cylindrical walls of the conduit means 1 for providing the cylindrical classifying stream therein, and this flow control means includes the annular, ring shaped tapering nozzle 2 the bottom end of which communicates with the top end of the conduit means 1. This flow control means also includes the flow-smoothing annular baffle structure 3 through which the gas is directed so as to have the smooth flow just prior to reaching the inlet of the nozzle 2 of the flow-control means.

According to one feature of the invention, however, the stream-smoothing baffle structure 3 can be arranged so that the annular cylindrical baffle members are coaxially arranged and have extending therebetween radial baffle members which extend parallel to the axis of the conduit means 1 and the nozzle 2, so that in this way a straight parallel flow for the classifying stream is achieved with this stream flowing parallel to the axis of the conduit means 1. However, if desired the radially extending baffle plates can be inclined so as to provide for the stream a predetermined twist so that this classifying stream will move along a helical path extending coaxially around the axis of the conduit means 1, and the degree of twist can be regulated to achieve a desired relationship between the tangential velocity of the particles and the classifying stream, as referred to above.

A rotary distributing plate means 4 is provided within the hollow inner cylindrical wall 5 coaxially with the latter, and the outer periphery of the distributing plate 4 is flush with the inner edge of the nozzle 2. In order to introduce additional gas into the region where the particles are centrifugally thrown from the distribution plate 4, the inner wall of the nozzle 2 is provided with an additional gas inlet nozzle 6 for achieving an additional inner auxiliary or preliminary classifying stream of hollow cylindrical configuration which is annular in cross section. Thus, the inner wall of the nozzle 2 is surrounded by an additional wall which is coaxial with and spaced slightly from this inner wall so as to define with the inner wall the additional nozzle 6 for the additional gas which is introduced independently through this additional nozzle 6, as is apparent from the upper right portion of FIG. 1. The radial thickness of the additional nozzle 6 of the flow control means is quite small with respect to the total radial width of the nozzle 2 in the region of the classifying zone. For example, the radial width of the nozzle 6 is normally less than 20% of the radial width of nozzle 2.

The outer wall of the conduit means 1 is provided at the classifying zone with an annular opening 7 through which the coarse particles flow into the discharge means 9 which coaxially surrounds the outer cylindrical wall of the conduit means 1 and which communicates with the annular outlet 7 thereof. An axially shiftable cylindrical blade 8 is telescopically slidable along the outer cylindrical wall of the conduit means 1 so as to adjust the vertical width of the annular opening 7, and this adjusting blade 8 can be fixed at any selected elevation as by a suitable set screw 24, protruding through a vertically elongated aperture in the outer wall of conduit means 1.

The annular discharge means 9 which receives the coarse particles is provided with a bottom frustoconical wall 10 which is so sharply inclined that the coarse particles slide downwardly along the inner surface of the bottom wall 10 to the outlet of the discharge means. The inner surface of the discharge means 9 may be covered with rubber or may have rubber walls. The annular outlet opening 7 for the coarse particles has an associated additional gas inlet 11 located upstream and adjacent thereto, and in the top of the discharge means 9 and it is through this additional gas inlet that the gas is supplied, for example by a suitable fan, the gas being sucked by the part of the classifying stream which flows past the opening 7. The amount of gas which is delivered in this way is controlled by a throttle valve 12 or the like.

The material which is centrifugally thrown from the outer periphery 13 of the distributing plate means 4 flies through the classifying zone 14 after first flying through a zone where the accelerated classifying gas stream provided by way of the auxiliary nozzle 6 has loosened up agglomerations of fine particles or has loosened fine particles from coarse particles to which the fine particles cling, so that these fine particles will not be carried along with the coarse particles.

The material which is to be classified is supplied by way of a feeding means which includes an axial feed pipe 15 which is coaxial with the axis of the classifier, the material being supplied through a rotary valve or bucket wheel 16 having cells which receive and deliver the material. Any other valve arrangement may be provided for delivering the granular material to the supply duct 15 along which the material flows centrally to the rotary distributing plate means.

In the figures, respective flows of granulated material are illustrated by hatched arrows whereas the directions of gaseous streams are indicated by plain arrows (no hatching).

The classification process takes place at the classifying zone 14 at the top of conduit 1 which is adjacent the outer periphery of the distributing plate means 4. The classifying gas stream has a free jet or stream surface 17 at the region of the coarse particle outlet opening 7 opposite to the plate means 4 and through which the coarse particles travel to be received in the discharge means 9. According to one feature of the present invention, the material from the rotary distributing plate means 4 is thrown centrifugally into the classifying zone 14 in a manner that all the particles have uniform speed components in any spatial direction. The fine particles which are separated from the coarse particles in the classifying zone are withdrawn below in a fine particle separating device which is connected to the structure of the invention and which may, for example, take the form of a cyclone. The classifying gas stream is preferably directed through an exterior circuit which delivers the stream to and takes it from the conduit means 1. At the free outer stream surface 17 of the classifying stream there is a turbulent mixing zone. This free stream surface at the outlet opening 7 is adjusted by means of the adjustable blade 8 in such a way that the turbulent mixing zone is situated at the coarse particle side while the inner core of the classifying stream reaches the fine particle side and is after having passed the classifying zone confined by the conduit means 1.

In order to separate the fine particles which cling to the coarse particles and in order to dissolve agglomerations of the fine particles these coarse particles are initially subject to an impact action by being thrown against a cylindrical wall 37 which concentrically surrounds the classifiying zone and which is situated in the interior of the discharge means 9 for the coarse particles. This wall 37 may be provided at its inner surface with a loose rubber curtain so as to be protected against wear and against clinging of fine particles to the impact wall, and the remaining coarse particles are subjected to the blowing action of an elutriation gas or of an additional stream of gas. For this purpose the sharply inclined frustoconical bottom wall 10 of the discharge means 9 is provided with slots 18 arranged in cascade so that the elutriation gas can be introduced through these slots. If this additional or elutriation gas is blown in and is not sucked in, for example by a suction fan communicating with discharge gas conduit 22, a conduit 20 for the elutriation gas, which is under pressure, can be provided and into which gas under pressure can be introduced through inlet 19 communicating with a blower or other pressure gas source, not shown in the drawing. Of course, if the elutriation gas is sucked in then a pressure conduit 20 is not required.

The fine particles which are thus separated from the coarse particles in the discharge means 9 are withdrawn through an annular chamber 21 within the discharge means 9. The radial width of the annular chamber 21, as well as the amount of admitted elutriation gas, are all so chosen and adjusted that a vertical stream of gas which flows upwardly in the opposite direction in which the gravitational force acts is produced in the annular chamber 21 whose flowing speeds exceeds to the nominal sinking or dropping speed of the fine particles separated from the coarse particles. The classifying elutriation gas stream of this second gravity type classifier in which the fine particles are suspended or entrained discharges from the annular chamber 21 through an outlet conduit 22.

The coarse particles are discharged from the classifier by way of an annular outlet slot 23 situated at the lowest part of the tapering funnel-shaped discharge means 9 for the coarse particles, as shown in FIG. 1. In conjunction with the slot 23, it is possible to provide swingable flaps (not shown) which are displaced by the coarse particles. These flaps will open automatically in response to weight of the coarse particles which accumulate in the discharge means 9. The discharged coarse particles are received in a conveyor means 26 which conveys them away, and in the illustrated example this conveyor means takes the form of a closed trough in which the particles are maintained in the forms of a fluidized bed flowing along this trough.

Figure 1A:
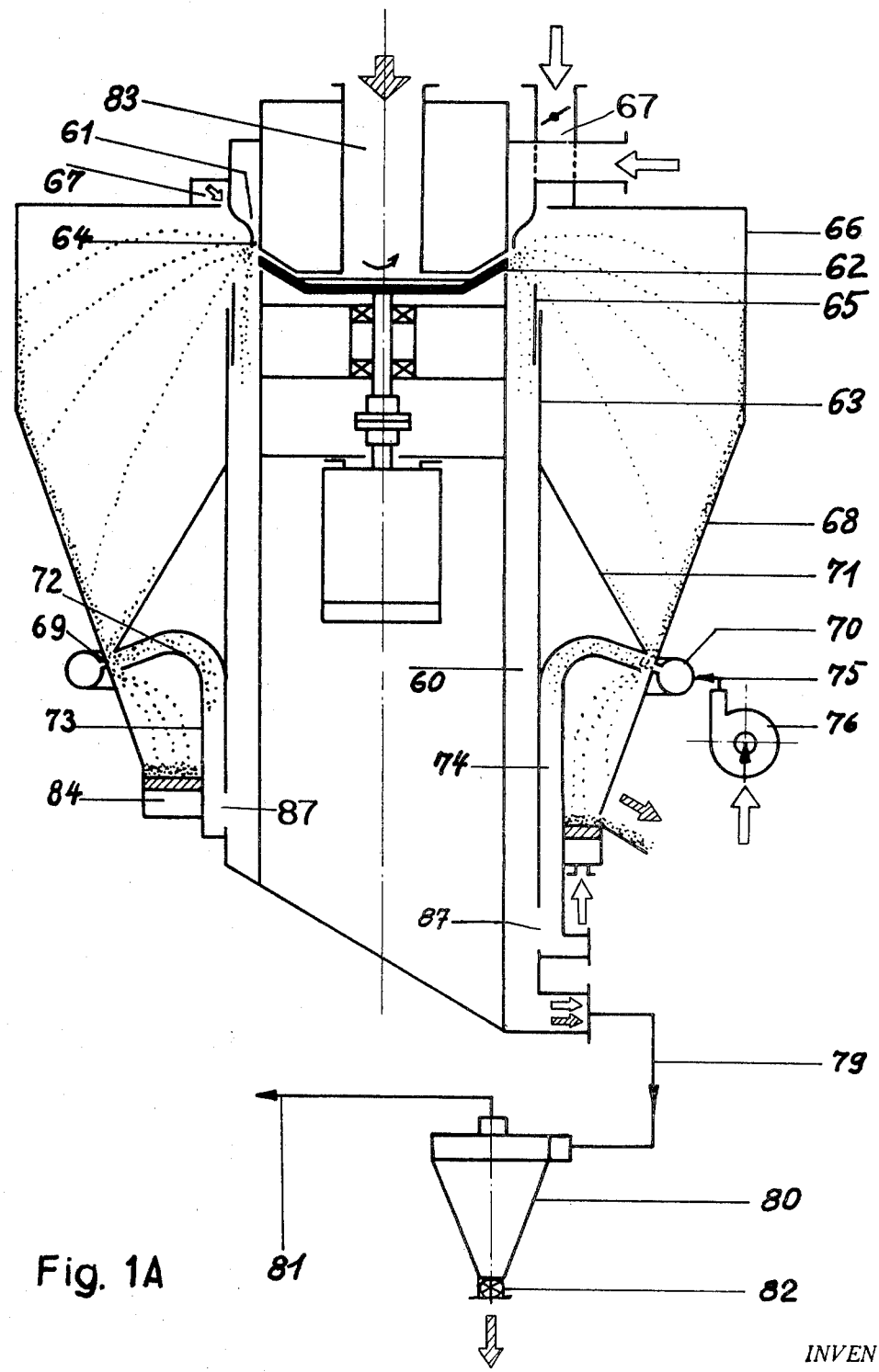
Figure 2:
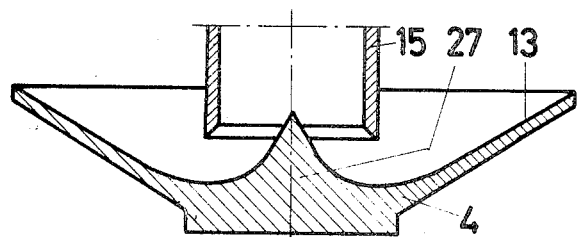

In the embodiment of the invention which is illustrated in FIG. 1A, the classifier of the invention has a hollow cylindrical classifying stream which is of circular cross section but which has an extremely small radial thickness. Thus, the conduit means 60, which corresponds to the conduit 1, communicates at its upper end with a nozzle 61 of the flow-control means of this embodiment, this nozzle 61 providing a hollow cylindrical classifying stream which has a radial thickness on the order of only a few millimeters, preferably 1–10 mm.

The use of such a narrow, high speed classifying stream or jet has proved very advantageous. Test with relatively high separation accuracy have been carried out with loads of 10 kilograms of particles per kilogram of air. The present arrangement can be built considerably smaller than prior art apparatus of the same output while considerably reducing the required stream of gas. In the alternative, with apparatus having the size of prior art devices a higher output can be achieved.

The inner circular edge of the nozzle 61 is of the same diameter as and is aligned with the outer periphery of the rotary distributing plate means 62. The outer wall 63 of the conduit means 60 for the classifying stream has a larger diameter than the outer wall 64 of the nozzle 61. At the upper edge of the outer cylindrical wall 63 of the hollow cylindrical conduit means 60 there is an adjusting blade 65 which acts in the same way as the blade 8 so as to adjust the classification limits of the classifier. Also, the diameter of the blade 65 is greater than the exterior diameter of the edge 64 of the nozzle 61. As a result of this construction the classifying cross stream which flows across the material centrifugally thrown from the distributing plate 62 will remain entirely within the interior of the conduit means 60 even if it is deflected in a radially outward direction to some extent by the particles thrown from the distributing plate 62. Therefore, with this construction the free stream which forms ahead of the nozzle 61 will not reach the discharge means 66 for the coarse particles to any appreciable extent. Beside the nozzle 61 an additional gas inlet or outer annular nozzle 67 is provided in communication with the interior of the coarse particle discharge means 66 for additional gas to be blown into the interior of the latter so that it will be acted upon by the suction of the free stream at the turbulent mixing zone thereof and will be carried along into the conduit 60 for the classifying stream.

The discharge means 66 is provided with an exterior frustoconical wall 68 which tapers downwardly and inwardly toward the conduit means 60 while the inner limit of the discharge means 66 is formed by the outer wall 63 of the conduit means 60. In this way the structure of FIG. 1A differs from that of FIG. 1.

A further difference resides in the fact that the measures relied upon for additional classification of the coarser particles in the discharge means 66 are different from the measures disclosed in FIG. 1 and described above.

This subsequent classification consists of a second classifying zone in which in a manner similar to that in the first zone, which follows nozzle 61, as far as possible predetermined separating or classifying conditions are present. These are: Possibly uniform speeds of the material during the passage of the stream of constant speed leaving nozzle 69 of annular conduit 70. The inaccuracy of the classification then depends mainly on the thickness of the layer of granular material. This subsequent classification serves to separate fine particles which reach the discharge means 66 together with the coarse particles and which are in the form of agglomerations of fine particles or in the form of fine particles which cling to the coarse particles. At the lower region of the discharge means 66 an annular nozzle 69 is found which is in communication with an annular conduit 70. A second post classifying gas stream is blown into the interior of the discharge means 66 for the coarse particles. Within the discharge means 66 there is situated above the nozzle 69 a downwardly and outwardly inclined frustoconical wall 71 which extends approximately up to but terminates slightly short of wall 68. A second curved wall 72 is provided approximately at the elevation of the nozzle 69. The front portion of this wall is designed as a blade and, as in the main zone, separates the fine particles from the coarse particles, since also in this classifying zone a loosening up of the material sliding down the wall 68 is achieved in the adjusted transverse stream classification. This wall 72 extends from a cylindrical extension 73 which is of larger diameter than and coaxially surrounds the outer cylindrical wall 63 of the conduit 60 and which forms with this outer cylindrical wall 63 a further conduit means 74 for a classifying stream through which fine particles and the classifying gas stream may be discharged in an accelerated manner. Thus the walls 71 and 72, 73 define the inner chamber 74 which receives fine particles separated in a second stage of classification from the coarse particles. An annular wall of transversely curved cross section forming a downwardly directed channel is provided between the walls 63 and 71. This upper curved wall merges into the walls 63 and 71, and the outer edge of the wall 71 as well as the outer upper edge of the wall 72 define between themselves an annular inlet which receives the gas which is blown in from the annular conduit 70 and the nozzle 69, so that the fine particles suspended in this latter gas will be received in the inner chamber 74. The gas under pressure is delivered to the nozzle 69 via annular conduit means 70 by way of a supply conduit 75 to which air is delivered by the fan 76. The outlet 87 near the bottom of the inner chamber 74 provides communication of the latter with the conduit 60 and can be extended about the entire circumference of the outer wall of conduit 60. In another modification, inner chamber 74 could communicate through a conduit with a separator (not shown) which may take the form of a cyclone separator. The air which discharges from the separator may be sucked through a further conduit into the blower or fan 76 and recirculated.

The bottom end of the conduit means 60 for the primary classifying stream communicates through a conduit 79 with a primary cyclone type of separator 80 provided for the fine particles which are entrained in the classifying stream which flows downwardly along the conduit means 60. The gas which discharges from the separator 80 through the conduit 81 can be directed along a circuit described below in connection with FIG. 11 and in this way can again reach the nozzle 61 so as to again be delivered to the classifying zone. The fine particles are discharged from the separator 80 through a rotary bucket wheel type of valve 82.

During operation of the classifier of FIG. 1A the central supply duct 83 for the material which is to be classified delivers the material to the central region of the rotary distributing plate means 62 from which the material is centrifugally delivered to the classifying zone where the fine particle fraction and coarse particle fraction of the granular material are separated from each other. The fine particle fraction becomes entrained in the classifying stream in the conduit means 60 while the coarse particles reach the discharge means 66. The trajectories of the coarse particles are indicated in dotted lines in FIG. 1A. The upper trajectories are those for the coarser and the lower trajectories are those for the finer particles. The coarse particles reach almost entirely the outer wall of the discharge means 66 and slide downwardly along the interior of its downwardly tapered inclined wall 68 so as to flow past the nozzle 69 through which the gas is delivered from the blower 76. The arrangement of the wall 71 and 72 with respect to each other is such that substantially all of the elutriation gas with the fine material is delivered between the walls 71 and 72 into the conduit means or inner chamber 74 provided for the second classifying stream so as to reach the conduit 60 through the outlet 87. When passing nozzle 69, in view of the adjusted speed which is smaller or larger depending on the thickness of the layer, but at least 10 meters per second, the material sliding on the wall 68 is so to speak "fanned" or spread out, and the fine particles is shaved off by wall 72 designed as a blade and delivered to the passage or inner chamber. The spread out coarse particles is, in a manner described with respect to FIG. 1 collected above an air delivery trough 84 and discharged through a discharge opening at the bottom of the conical wall 68. The construction of this form of secondary classification to separate additional fine particles from the coarse particles is such that the suction of the air takes place in the region of the center of the classifier. With the embodiment of FIG. 1A the suction is provided for the air discharging from the nozzle 69 into the conduit 74.

The gas which discharges from the conduit means 70 through the annular nozzle 69 will reach the interior of the conduit means 60 through the opening 87 and will reach the primary separator 80 through the conduit 79. The blower 76 will then simply suck clean gas, usually air, to be delivered under pressure through the conduit 75 to the annular conduit means 70. The opening or openings 87 which provide communicaiton between the conduits 74 and 60 are preferably adjustable so that the amount of air flowing between the conduits 74 and 60 can be regulated in accordance with the requirements. This type of secondary classification is not limited to a single stage. It can be repeated two or more times, particularly where an extremely high accuracy of classification is required. It is advisable to provide the wall 68 above the annular gap 69 with a predetermined length in excess of 0.5 meters so that the coarse particles will achieve a correspondingly high predetermined, well-defined slipping speed. A slipping or sliding length for the coarse particles along the interior of the wall 68 on the order of 0.5–1 meter is preferred. The classifying gas discharges from the nozzle 61 of the flow control means preferably at a speed of more than 100 meters per second. The granular material is centrifugally thrown from the rotary distributing plate 62 at a speed of more than 5 meters per second.

The use of a rotary distributing plate means for supplying the granular material to the classifying cross stream carries with it a series of great advantages. Thus, for example, even where the zone of discharge of the granular material from the periphery of the plate has a relatively small diameter, it is possible to achieve a relatively large discharge zone from the rotary distributing plate while using a relatively small construction. In contrast with a conveyor band of the type shown in U.S. Pat. 3,311,234, the roatry distributing plate can extend directly up to and be situated at the classifying cross stream with the periphery of the distributing plate situated directly at the inner surface of the hollow cylindrical cross stream, so that the unavoidable free trajectory space resulting from the radius of a roller or belt type of conveyor between the place where the particles leave the latter type of conveyor and where they enter into the classifying stream is eliminated.

When using rotary distributing plates having the structure shown in FIGS. 2–8, where these plates have upwardly directed concave or frustoconical surfaces for receiving the material, there will be in addition to the gravity components a centriufgal component resulting from the localized circumferential speed, this centrifugal component pressing the individual particles against the surface of the distributing plate and requiring further acceleration to overcome the pressure of the particles against the wall of the distributing plate. The concave inner surface of the distributing plate 4 according to FIG. 2 has a combination of conical and curved surfaces of rotation. The distributing plate is driven from below by way of a motor whose speed of rotation can be adjusted. Because the distributing plate rises upwardly in the direction in which the material flows to be discharged therefrom, the particles at the periphery of the plate which are thrown from this periphery have besides their circumferential speed components, a speed component in a radial and in a vertical direction. The particles therefore leave the rotary distributing plate relative to the rotary system at a predetermined angle.

There is provided at the center of the rotary distributing plate either an upwardly directed coaxial conical projection 27 which directs the material received from the supply pipe 15 into the regions of higher circumferential speed, or such a projection may be eliminated and instead there will form at the central region of the upper surface of the plate from the material itself a constantly self-renewing cone of the granular material which functions in the same way. This type of rotary distributing plate means is, however, useful only in connection with relatively small throughputs, since the cone of material or the pointed projection 27 provides the particles with a radial speed whose magnitude determines the throughput and which in general is relatively small.

Figure 3:
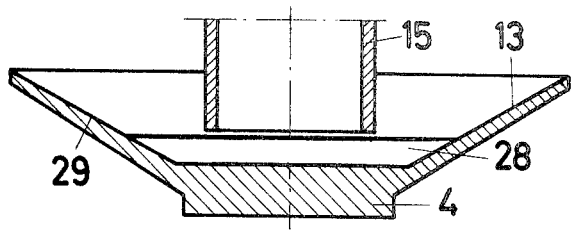
Figure 4:
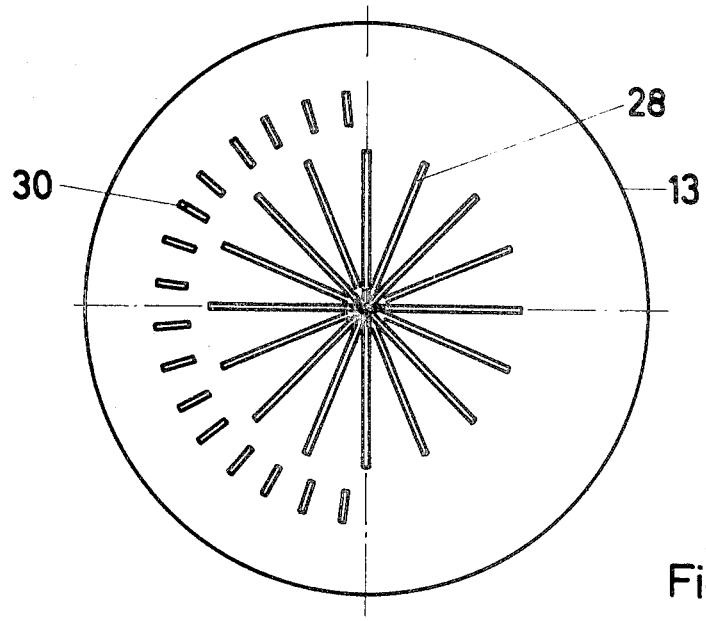

As is indicated in FIGS. 3 and 4, at the right half thereof, the rotary distributing plate means can have a construction which will provide a greater throughput by providing the plate means at its center with a number of blades 28 which preferably extend radially or which may have any desired curvature and which compel the material received from the feed pipe 15 to be accelerated and to be conducted under the action of the centrifugal force acting on the particles at a relatively high radial speed to the outer peripheral region 29 where the upper surface of the distributing plate is smoothed and unprofiled. In order to prevent the particles from slipping at the unprofiled outer region of the distributing plate it is required that the blades extend all the way up to the region of the outer periphery of the distributing plate. Such a construction cannot, however, be provided by way of a circular row of blades which extend from the center of the plate. Inasmuch as the granular material delivered to the rotary distributing plate accumulates ahead of the blades under the action of the Coriolis force and the spacing between the blades increases in a radially outward direction, the material upon leaving the blades and reaching the unprofiled outer peripheral portion of the plate will no longer be uniformly distributed and instead will leave the distributing plate in the form of localized concentrations of material.

It is possible to eliminate these undesirable actions to a very large extent by providing an arrangement as shown at the left half of FIG. 4 according to which there is situated outwardly of the left series of blades one or more additional series of blades 30 which are situated closer to each other so that there is a larger number of these outer row or rows of blades 30. Each of the latter rows of blades must be formed in such a way that the granular material leaves the blades in a layer which is uniformly distributed circumferentially about the distributing plate at the region of its outer periphery where there are no blades, so that at the region of its outer periphery there are no blades, and so that the successive rows of blades will be uniformly supplied with material and the material will be uniformly distributed from the distributing plate 4 circumferentially with respect thereto.

Figure 5:
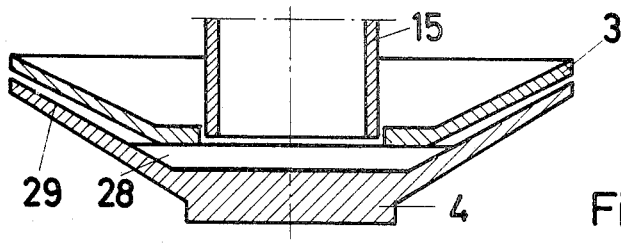

The distributing plate 4 of FIG. 5 is provided with a cover 31 which covers the larger region of the ring of blades 28 and the peripheral surface 29 of the frustoconical portion of the distributing plate up to the outer periphery thereof with the cover 31 being situated at a relatively small distance from the upper surface of the plate 4, this cover being directly carried by the upper edges of the blades 28. The hub of the plate 4 can also advantageously be provided with spacers having a configuration conforming to the flow paths of the material. The cover 31 is formed in such a way that the gap between the cover 31 and the upper surface 29 of the plate 4 continuously diminishes in thickness toward the outer periphery of the distributing plate means and the extent of reduction in the space between the surface 29 and the plate 31 is selected in such a way that the passage through which the granular material flows remains constant in cross section. In other words, the reduction in the thickness of the space between the surface 29 and the plate 31 compensates for the increasing diameter of this space so that the total cross sectional area through which the granular material flows remains constant throughout the radius of the distributing plate means 4.

Figure 6:
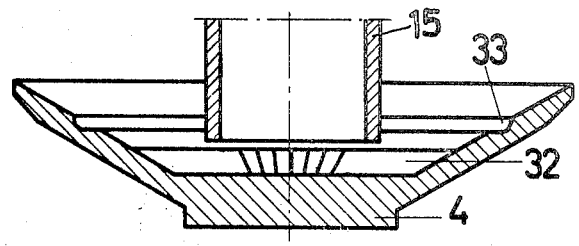
Figure 7:
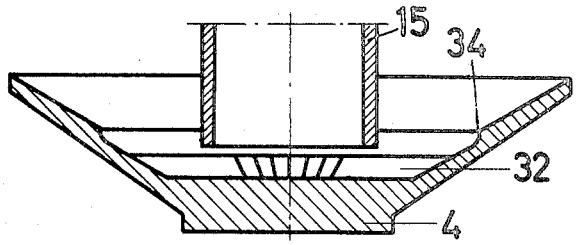

In order to provide for a uniform distribution of the granular material at the outer periphery of the distributing plate in a circumferential direction so as to avoid localized concentrations of granular material the distributing plate of FIG. 6 is provided with an annular groove 33 which is situated at a small distance outwardly from the ring of radially extending blades 32. These blades 32 do not extend in this embodiment up to the central part of the plate 4 but instead extend only up to the region of the central part thereof. In the groove 33 the granular material accumulates and is distributed circumferentially so as to be spread out and thus be further guided to the outer region of the distributing plate in the form of a layer which is of a uniform circumferential thickness. The uniformity in the circumferential distribution is achieved with the embodiment of FIG. 7 also by way of a lip 34 extending upwardly from the upper surface of the rotary distributing plate 4 and also situated at a small distance outwardly beyond the blades 32.

Figure 8:
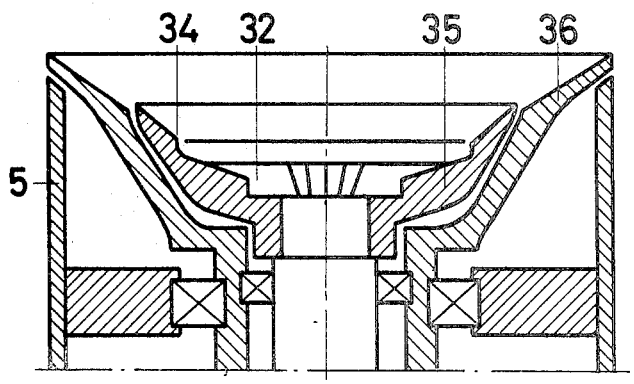

For providing a uniform distribution of the granular material which flows outwardly beyond the ring of radial blades it is also possible to provide a rotary distributing plate means which is divided into a pair of sections in a radial direction. Such a construction is shown in FIG. 8. This embodiment has an inner distributing plate 35 and an outer annular distributing plate 36. The inner plate 35 is supported for rotary movement with respect to the outer plate 36 which at its inner region is in the form of a frustocone, so that the pair of distributing plates can be driven at different rotary speeds. For this purpose either separate drives are provided or the shaft which is connected to the inner plate and the hollow shaft which is connected to the outer plate are connected to each other through a known transmission which will provide the different speeds of rotation for the pair of plates 35 and 36. The inner plate 35 has outwardly beyond but closely adjacent to the ring of radial blades 32 an annular lip 34 so that the granular material which flows outwardly beyond the ring of radial blades will be already uniformly distributed to a large extent on the plate 36 which will in general rotate at a somewhat higher speed, so that a uniformly distributed layer will be circumferentially delivered to the outer plate 36.

In order to stabilize this arrangement of rotary distributing plates the distributing means can be mounted directly at the upper end on the iner cylindrical wall 5, as indicated in FIG. 8.

Figure 9:
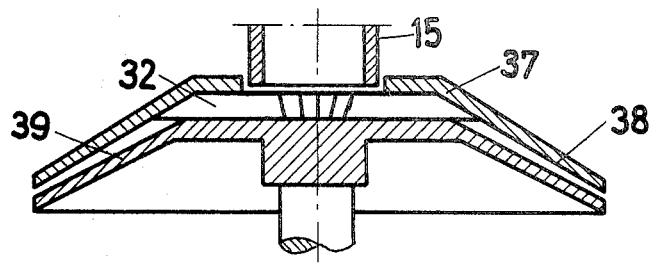

FIG. 9 shows a rotary distributing plate means 37 which is provided with a downwardly directed concave surface 38 extending downwardly from the region where the material is delivered from the feed pipe 15. The ring of radially extending blades 32 do not extend up to the center of the downwardly directed plate 37 and at their outer ends the blades 32 terminate at the small diameter end of the frustoconical portion of the plate 37. Beneath the plate 37 the latter is provided with a cover 39 or with a lower plate, and a drive is delivered by way of this lower plate 39 to the rotary distributing plate means 37 of FIG. 9.

Figure 10:
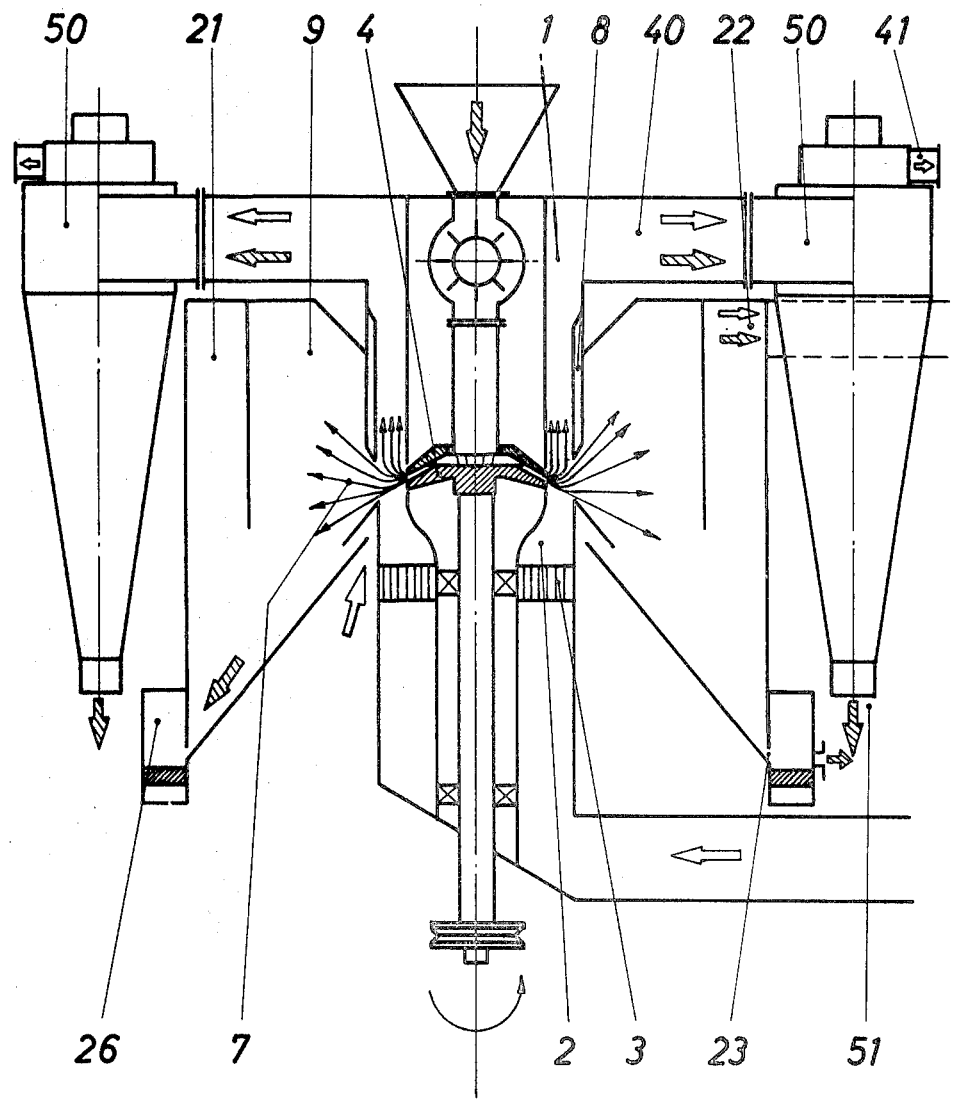

The classifier which is shown in FIG. 10 has an upwardly directed classifying gas stream which is also directed through the elongated conduit means 1 of this embodiment. Thus, in this case also the classifying cross stream has the configuration of a hollow cylinder of circular cross section. The classifying stream is supplied through a nozzle 2 which tapers upwardly and which is situated below and just ahead of the conduit means 1 for the cylindrical classifying stream. The rotary distributing plate means 4 of this embodiment has the construction shown in FIG. 9. It is also possible to use the embodiments of FIGS. 2–8. The inner cylindrical wall of the conduit means 1 is provided with an annular opening which receives the material centrifugally thrown from the distributing plate means 4, and the outer cylindrical wall of the conduit means 1 is provided with an annular outlet opening at the same elevation as the annular opening of the inner wall so that the coarse particles will flow through the outlet opening 7 which is in part limited by the axially shiftable cylindrical adjusting blade 8. The receiving or discharge means 9 for the coarse particles surrounds and communicates with the outlet opening 7, and this discharge means 9 is constructed and operates in the same manner as described above in connection with FIG. 1 so as to separate from the coarse particles any fine particles which cling thereto.

With the embodiment of FIG. 10 the coarse particles leave the discharge means 9 at its lowest point, where it tapers downwardly in a funnel-shaped configuration, through a small circumferential slot 23 and reaches in this way a fluidized bed trough 26 of helical configuration along which the coarse particles are transported to a single outlet.

Moreover, at the coarse particle side there is the secondary gravity type of classification which takes place in the outer annular chamber 21. The fine particles at this latter classifier leave the entire classifier along the conduit 22. This latter outlet 22 may take the form of a tangential outlet in which the gas in which the fine particles are dispersed flows, and this gas with the fine particles suspended therein may be delivered either directly to the cyclone 50 or may be directed through additional separators situated at the exterior of the classifier. The classifying gas which has the fine particles suspended therein flows from the conduit means 1 for the classifying stream and through the tangential outlets 40 which extend from the conduit means 1 to the cyclones 50. The fine particles are removed from the lower ends 51 of the cyclones 50 from where these fine particles are conveyed in an unillustrated helically shaped fluidized bed type of trough to a single outlet. The classifying gas which discharges at the upper outlet 41 of the cyclones 50 is collected, for example, in a ring-shaped conduit, and, as shown in FIG. 11 and described below, directed to a blower or fan 53.

Figure 11:
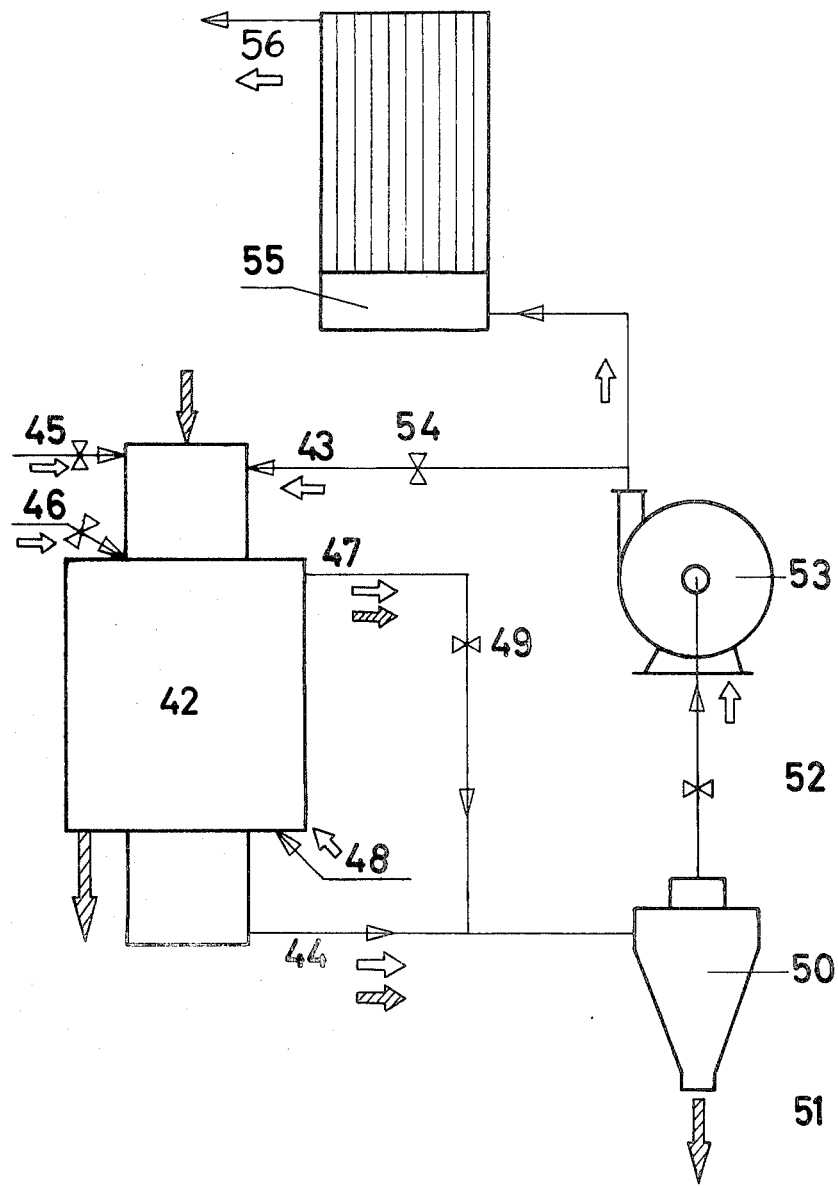

FIG. 11 schematically illustrates an embodiment of the entire illustration of the invention. The circuit which is provided for the classifying gas communicates with the classifier 42 by way of a supply conduit 43 and leaves the classifier 42 by way of the discharge conduit 44 together with the fine particles which are entered in the classifying stream. In accordance with the selected adjustment of the classifier, the volume of gas discharged through the conduit 44 can also be composed in part of the additional classifying gas which enters through the inlet 45 and in part by the additional gas which is sucked in through the inlet 46. Normally, however, the amount of gas flowing through the conduit 44 is approximately equal to that which enters through the conduit 43. The conduit 47 serves to direct away from the discharge means for the coarse particles the classifying gas of the secondary classification in which the fine particles which are separated in the discharge means are suspended. Thus, the fine particles flow out with the secondary classifying gas through the conduit 47 and the gas in the conduit 47 is formed in part by the gas introduced through the inlet 46 and the elutriation gas introduced through the inlet 48 as well as under certain circumstances from the gas withdrawn from the turbulent mixing zone at the region of the axially adjustable coaxial blade 8. Thus, at this latter zone a part of the primary classifying stream will be directed into the discharge means for the coarse particles to flow out through the conduit 47.

The gas volume for the secondary classification and the fine particles dispersed therein, after passing through the throttling unit 49, combined with the primary quantity of fine particles and the primary classifying stream in the conduit 44 and are delivered therewith to the cycline 50 or to another type of separator. At the cyclone 50 the fine particles 51 are separated from the gas stream and the gas, which has now been substantially freed of fine particles, flows after passing through an additional throttling component 52 into the inlet of the blower 53. The amount of gas delivered by the blower 53 will in general be greater than the amount introduced through the conduit 43 into the classifier because of the additional gas derived by way of the inlets 45, 46 and 48. The amount of gas introduced through the inlet 43 into the classifier is controlled by the throttle valve 54. The excess gas, which may still contain extremely fine particles which were not separated in the cyclone, must therefore be separated from the circuit. This excess gas leaves the circuit through a further separator such as, for example, a hose or tubular filter assembly 55, or when relatively large amounts of gas are involved and/or relatively high gas temperatures an electro-filter may be used, and the cleaned gas discharges into the open air at the outlet 56 from the filter 55.

With the structure of the invention it is possible to adjust the accuracy of classification of the classifier by proper selection of the speed of flow of the classifying stream, the speed of rotation of the rotary distributing plate means, as well as the axial position of the cylindrical blade 8.

This last adjusting possibility is always maintained. In order to reduce the wear on the edge of the adjusting blade 8, this blade can be provided with an edge which is directed in the path of movement of the particles.

What is claimed is:

1. In a method of classifying granular material within classification limits of less than one millimeter in a classifying cross stream of uniform thickness having, so as to eliminate a dominant influence of gravity, a speed of at least 20 meters per second and across which the particles to be classified are directed in a thin layer at a speed of more than five meters per second so that only the fine particles are entrained in the classifying cross stream while the coarse particles move transversely through and beyond the classifying cross stream to be collected outside said classifying cross stream, the steps of generating the classifying cross stream with the configuration of a hollow cylinder of circular cross section and directing, axially to the stream, the particles into a space which is surrounded by said cylindrical stream and centrifugally throwing the particles from said space across the classifying cross stream with speed components for the particles which are substantially equal in any spatial direction with respect to the classifying cross stream, while preventing rebounding and reverse flow of the coarse particles into said classifying cross stream.

2. In a method as recited in claim 1, the step of confining the classifying stream after it has crossed the coarse particles and entrained the fine particles.

3. In a method as recited in claim 1, said step of generating said stream with said configuration of said cylinder including the reduction of the radial width of the stream while providing said stream with a speed of flow greater than 20 meters per second.

4. In a method as recited in claim 1, the step of providing for the cylindrical stream at the region of its inner surface a cylindrical portion having a thickness which is a small portion of the total thickness of the stream and having a speed of flow substantially greater than that of the remainder of the stream, so that the particles initially are introduced into the inner cylindrical portion of the stream of high speed and small thickness.

5. In a method as recited in claim 1 and wherein gas is sucked in by said classifying stream from outside providing said gas upstream the region where the coarse particles move outwardly beyond the latter.

6. In a method as recited in claim 1, the step of generating said cylindrical classifying stream with a small twist.

7. In a method as recited in claim 1, the step of generating said cylindrical classifying stream as a hollow cylindrical classifying jet, having a radial extension within the range of from approximately one to ten millimeters and a speed in excess of one hundred meters per second.

8. In a method as recited in claim 1, the additional steps of subjecting the coarser particles which pass through and beyond the classifying stream to an additional stream of gas which separates from the coarser particles finer particles which cling thereto, uniting said additional stream of gas which entrains the separated finer particles with said classifying stream so that all finer particles entrained in the united gas stream can subsequently be separated therefrom.

9. In a classifier, hollow conduit means of circular cross section having an inner wall and an outer wall coaxially surrounding and spaced from said inner wall, said walls having inlet rims defining an inlet opening substantially in a plane normal to the common axis of said walls, rotary distributing plate means situated coaxially within said inner wall in front of said inlet opening of said walls so that particles will be centrifugally thrown by said distributing plate means past the said inlet opening defined between said walls of said conduit means, annular flow control means axially with and spaced from said conduit means, and communicating with the space between said walls of that conduit means for directing longitudinally along said space and into said inlet opening a cylindrical classifying gas stream which flows past the said inlet rims of said walls and axially thereto for entraining fine particles in said stream while coarser particles thrown through and beyond said stream in front of said inlet rims of said inner and outer walls are discharge past said inlet rim out of said outer wall into discharge means coaxially surrounding said hollow conduit means and communicating with an annular discharge opening defined between said flow control means and the inlet rim of the said outer wall for receiving and discharging the coarse particles, feeding means communicating with said rotary disturbuting plate means for feeding centrally thereto particles, which are to be classified, drive means operatively connected to said distributing plate means for rotating the plate means with a speed sufficient to throw the particles with speeds of at least 5 m./sec. from said plate means, and blower means communicating with said flow control means for feeding a classifying gas thereto sufficient to emanate of said flow control means with a speed of at least 20 m./sec.

10. The combination of claim 9 and wherein said discharge means has an outer frustoconical wall along the interior of which the coarse particles move in a downward direction, an outlet for the coarse particles disposed at a lower portion of the frustoconical wall, annular conduit means surrounding and connected with said frustoconical wall of said discharge means for directing through said wall inwardly across the coarse particles sliding downwardly along the interior thereof an additional gas stream which separates from the coarse particles fine particles which cling thereto, and inner chamber means surrounding said hollow cylindrical conduit means, surrounded by said frustoconical wall of said discharge means, and having an annular inlet aligned with said annular conduit means and situated inwardly of but adjacent to the downward path of movement of the coarse particles along the interior of said frustoconical wall for receiving through said annular inlet the stream from said annular conduit means in which fine particles separated from the coarse particles are suspended, so that the fine particles will be received in said inner chamber means to be subsequently collected.

11. The combination of claim 10 and wherein said discharge means has a lower outlet for the coarse particles and has a configuration tapering downwardly toward said lower annular outlet with said discharge means having an inner inclined bottom wall directing said coarse particles past said annular conduit means in the outer frustoconical wall.

12. The combination of claim 9 and wherein said annular flow control means includes an outer annular nozzle coaxially communicating with the space between said walls and feeding one portion of the classifying stream longitudinally therethrough and an inner annular nozzle surrounded by said outer annular nozzle, feeding a second portion of said stream longitudinally along the space between said walls, and said inner annular nozzle having a radial width which is substantially smaller than the radial width of said outer nozzle.

13. The combination of claim 9 and wherein a gas inlet means communicates with the interior of said discharge means for introducing into the latter an elutriation gas for separating from the coarse particles fine particles which cling thereto.

14. The combination of claim 9 and wherein said rotary distributing plate means is of a concave, dished configuration at its surface which receives at its central portion the material to be classified.

15. The combination of claim 14 and wherein said distributing plate means has at said surface thereof blades extending from the region of the center of said plate means toward but terminating at a substantial distance short of the periphery of said plate means.

16. The combination of claim 15 and wherein said distributing plate means includes a cover extending along and situated at a relatively short distance from said surface, said cover extending up to the outer periphery of said plate means.

17. The combination of claim 15 and wherein said surface of said plate means is provided outwardly beyond and at a relatively short distance from said blades with an annular groove.

18. The combination of claim 15 and wherein said plate means includes an inner rotary plate provided with said blades and an outer rotary plate extending outwardly beyond said inner rotary plate, and a pair of drives respectively connected operatively to said rotary plates for respectively driving them at different speeds of rotation.

19. The combination of claim 9 and wherein a gas inlet communicates with said discharge means to direct gas into the region of said annular discharge opening defined between said flow control means and the inlet rim of said outer wall.

20. The combination of claim 9 and wherein a cylindrical blade means is situated at said inlet rim of the outer wall and is longitudinally shiftable along said outer wall for adjusting the width of said annular discharge opening.

21. The combination of claim 9 and wherein said flow control means includes an annular nozzle, the outer diameter of the nozzle outlet opening being smaller than the diameter of the inlet opening of the outer cylindrical wall.

22. The combination of claim 9 and wherein said annular flow control means include an annular nozzle of the converging type and has an outlet the radial width of which is within the range of from approximately one to ten millimeters.

References Cited

UNITED STATES PATENTS

| | | | |
|---|---|---|---|
| 234,724 | 11/1880 | Printz | 209—139 X |
| 459,267 | 9/1891 | Clarkson | 209—145 |
| 1,358,375 | 11/1920 | Koch | 209—145 |
| 1,877,861 | 9/1932 | Hatch | 209—139 |
| 1,888,372 | 11/1932 | Bramwell | 209—139 |
| 2,577,295 | 12/1951 | Ahlmann | 209—141 |
| 2,865,504 | 12/1958 | Zubrzycki | 209—138 |
| 3,378,140 | 4/1968 | Wochnowski | 209—137 |
| 3,311,234 | 3/1967 | Rumpf et al. | 209—137 |

FOREIGN PATENTS 798,885 7/1958 Great Britain.

FRANK W. LUTTER, Primary Examiner

U.S. Cl. X.R.

209—148, 154